(12) United States Patent
Chen et al.

(10) Patent No.: US 7,466,649 B1
(45) Date of Patent: Dec. 16, 2008

(54) METHOD FOR SETTING A VALUE OF WAITING TIME FOR SWITCHING

(75) Inventors: Chienho Chen, Shinagawa-Ku (JP); Masakazu Satoh, Setagaya-Ku (JP); Kazunari Suzuki, Ichikawa (JP); Takashi Murata, Sumida-Ku (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/060,201

(22) Filed: Mar. 31, 2008

(51) Int. Cl.
*H04L 12/26* (2006.01)
(52) U.S. Cl. .................................................... 370/225
(58) Field of Classification Search .................. None
See application file for complete search history.

(56) References Cited

U.S. PATENT DOCUMENTS

| | | | |
|---|---|---|---|
| 5,475,676 A | 12/1995 | Takatori et al. ............ 370/16.1 |
| 6,023,452 A * | 2/2000 | Shiragaki .................... 370/227 |
| 6,442,694 B1 | 8/2002 | Bergman et al. ............ 713/201 |
| 6,538,987 B1 | 3/2003 | Cedrone et al. ............. 370/216 |
| 6,697,373 B1 | 2/2004 | Sandstrom ................... 370/405 |
| 6,728,205 B1 * | 4/2004 | Finn et al. .................... 370/217 |
| 6,850,483 B1 | 2/2005 | Semaan ....................... 370/218 |
| 6,895,182 B1 * | 5/2005 | Moriyama et al. ............. 398/3 |
| 6,980,568 B1 | 12/2005 | Reynov et al. ............... 370/503 |

(Continued)

FOREIGN PATENT DOCUMENTS

JP  2001-298649  10/2001

(Continued)

OTHER PUBLICATIONS

"Introduction to Sonet" http://compnetworking.about.com/od/hardwarenetworkgear/I/aa092800b.htm, no date.

(Continued)

*Primary Examiner*—Anh-Vu H Ly
(74) *Attorney, Agent, or Firm*—Zilka-Kotab, PC

(57) ABSTRACT

In one general embodiment, a method for setting a value of waiting time for switching is provided. At a node in a sonet ring, it is determined which path to the node is an actual path and which path is a preliminary path. Additionally, it is determined whether a one way fiber transmission delay of the actual path is less than a one way fiber transmission delay of the preliminary path. If the one way fiber transmission delay of the actual path is greater than the one way fiber transmission delay of the preliminary path, a switching time is set to zero and normal switching is performed. If the one way fiber transmission delay of the actual path is less than the one way fiber transmission delay of the preliminary path, a switching time is set equal to the one way fiber transmission delay of the preliminary path minus the one way fiber transmission delay of the actual path and it is determined whether a path alarm indication signal (AIS) occurred in the actual path. If the path alarm indication signal occurred in the actual path, path switching of the actual path is stopped within the switching time and it is determined whether a path alarm indication signal occurred in the preliminary path. If the path alarm indication signal did not occur in the preliminary path, normal path switching is performed for the actual path.

1 Claim, 2 Drawing Sheets

U.S. PATENT DOCUMENTS

| | | | |
|---|---|---|---|
| 7,095,714 B2 * | 8/2006 | Suetsugu et al. | 370/222 |
| 7,136,388 B2 | 11/2006 | Friedrichs et al. | 370/395.62 |
| 7,200,109 B2 | 4/2007 | Semaan | 370/223 |
| 7,406,032 B2 * | 7/2008 | Li et al. | 370/217 |
| 2003/0142678 A1 | 7/2003 | Chan et al. | 370/395.1 |
| 2004/0114511 A1 | 6/2004 | Mochizuki et al. | 370/217 |
| 2006/0098660 A1 | 5/2006 | Pal et al. | 370/395.51 |
| 2007/0081451 A1 * | 4/2007 | Fujimori et al. | 370/227 |
| 2008/0095047 A1 * | 4/2008 | Skalecki et al. | 370/225 |

FOREIGN PATENT DOCUMENTS

WO    WO2006/072053 A2    7/2006

OTHER PUBLICATIONS

RPR Protocols (802.17 and SRP) 2004 Cisco Systems, Inc.

* cited by examiner

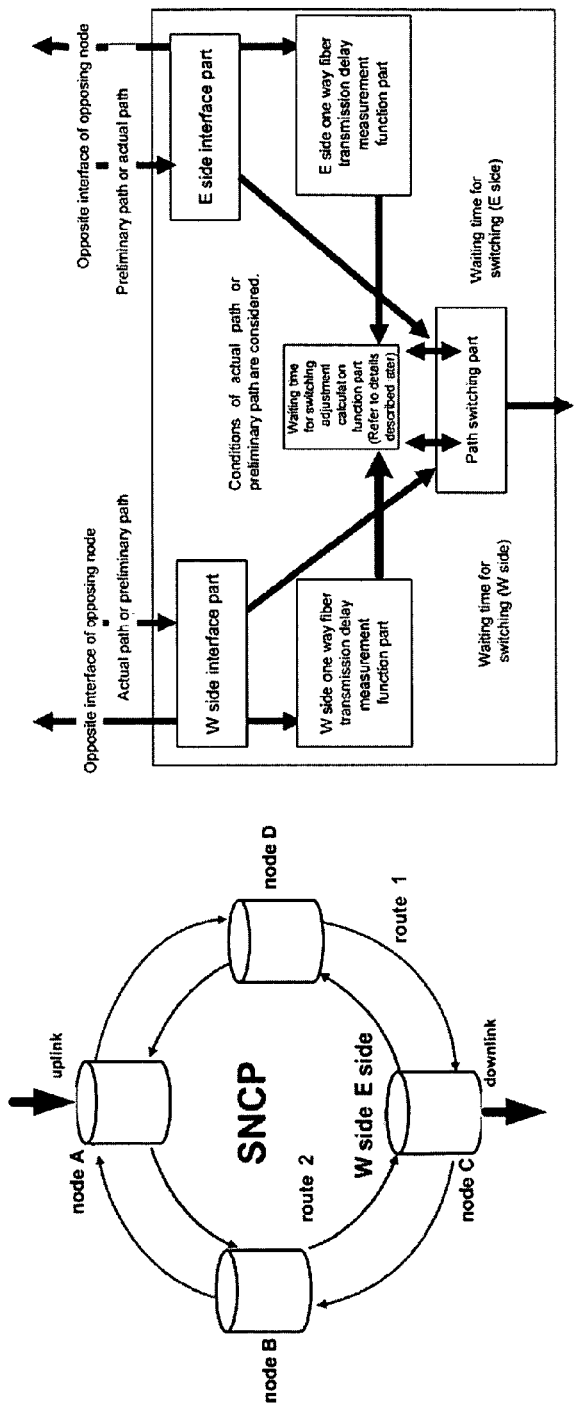
FIGURE 2B
FIGURE 2A
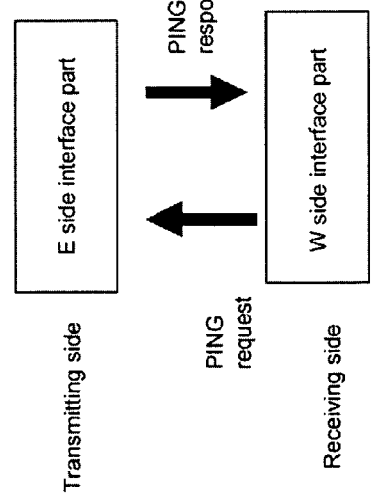
FIGURE 2C

METHOD FOR SETTING A VALUE OF WAITING TIME FOR SWITCHING

BACKGROUND

The present invention relates to ring networks, and more particularly, this invention relates to switching on ring networks.

Currently, when a path alarm indication signal (AIS) is generated by an abnormal transmission path at a path transmission end, unnecessary switching may occur at the path receiving end.

SUMMARY

In one general embodiment, a method for setting a value of waiting time for switching is provided. At a node in a sonet ring, it is determined which path to the node is an actual path and which path is a preliminary path. Additionally, it is determined whether a one way fiber transmission delay of the actual path is less than a one way fiber transmission delay of tie preliminary path. If the one way fiber transmission delay of the actual path is greater than the one way fiber transmission delay of the preliminary path, a switching time is set to zero and normal switching is performed. If the one way fiber transmission delay of the actual path is less than the one way fiber transmission delay of the preliminary path, a switching time is set equal to the one way fiber transmission delay of the preliminary path minus the one way fiber transmission delay of the actual path and it is determined whether a path alarm indication signal (AIS) occurred in the actual path. If the path alarm indication signal occurred in the actual path, path switching of the actual path is stopped within the switching time and it is determined whether a path alarm indication signal occurred in the preliminary path. If the path alarm indication signal did not occur in the preliminary path, normal path switching is performed for the actual path.

Other aspects, advantages and embodiments of the present invention will become apparent from the following detailed description, which, when taken in conjunction with the drawings, illustrate by way of example the principles of the invention.

BRIEF DESCRIPTION OF THE SEVERAL VIEWS OF THE DRAWING

FIG. 2A shows a ring network, in accordance with one embodiment.

FIG. 2B, shows the function of reception nodes of FIG. 2A, in accordance with one embodiment.

FIG. 2C, shows an interaction between different interface devices of FIG. 2A, in accordance with one embodiment.

DETAILED DESCRIPTION

Figure 1:
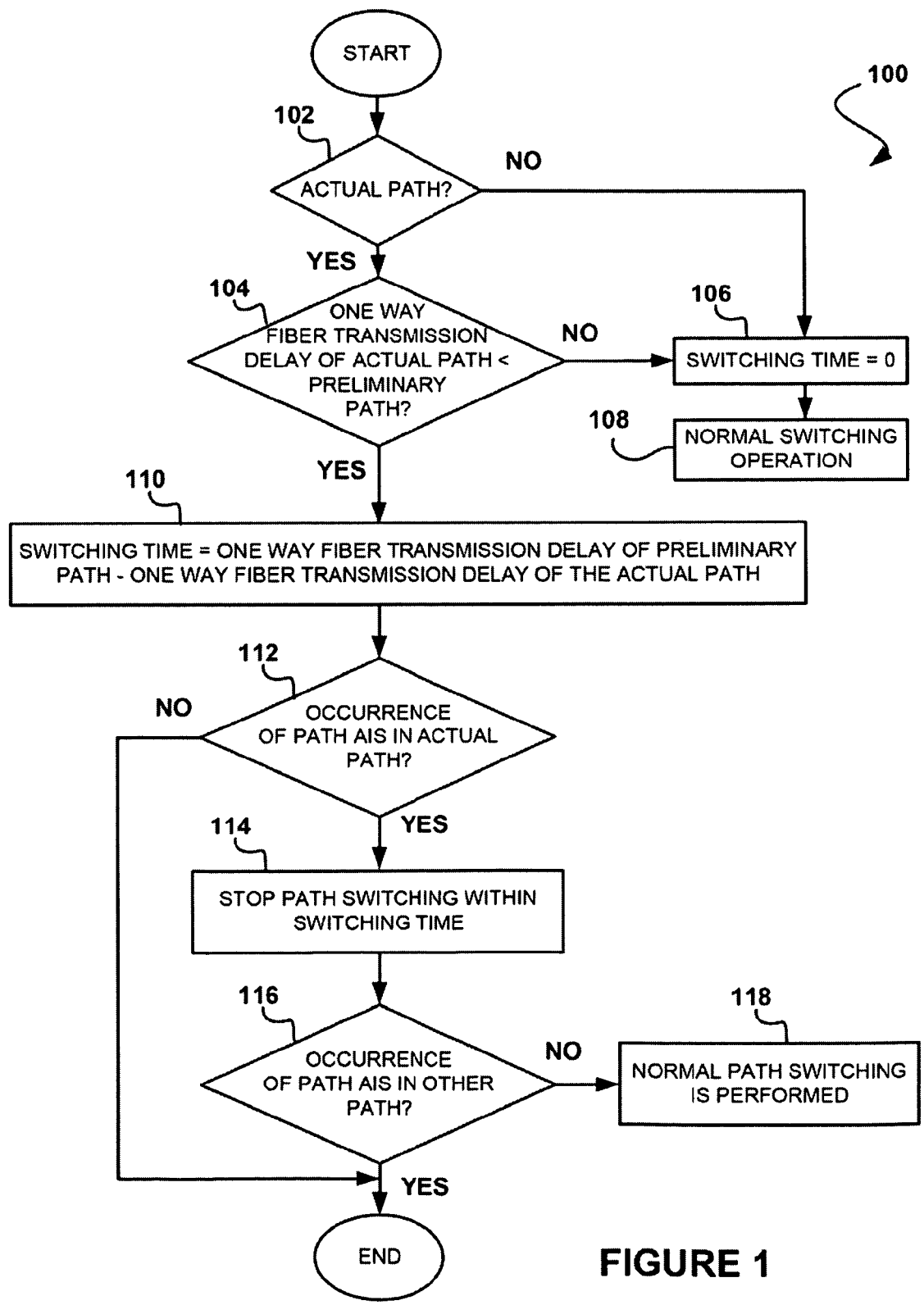
FIG. 1 shows a method for setting a value of waiting time for switching, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

In one general embodiment, a method for setting a value of waiting time for switching is provided. At a node in a sonet ring, it is determined which path to the node is an actual path and which path is a preliminary path. Additionally, it is determined whether a one way fiber transmission delay of the actual path is less than a one way fiber transmission delay of the preliminary path. If the one way fiber transmission delay of the actual path is greater than the one way fiber transmission delay of the preliminary path, a switching time is set to zero and normal switching is performed. If the one way fiber transmission delay of the actual path is less than the one way fiber transmission delay of the preliminary path, a switching time is set equal to the one way fiber transmission delay of the preliminary path minus the one way fiber transmission delay of the actual path and it is determined whether a path alarm indication signal (AIS) occurred in the actual path. If the path alarm indication signal occurred in the actual path, path switching of the actual path is stopped within the switching time and it is determined whether a path alarm indication signal occurred in the preliminary path. If the path alarm indication signal did not occur in the preliminary path, normal path switching is performed for the actual path.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

FIG. 1 shows a method 100 for setting a value of waiting time for switching, in accordance with one embodiment. As shown, at a node in a sonet ring, it is determined which path to the node is an actual path and which path is a preliminary path. See operation 102. Additionally, it is determined whether a one way fiber transmission delay of the actual path is less than a one way fiber transmission delay of the preliminary path. See operation 104.

If the one way fiber transmission delay of the actual path is greater than the one way fiber transmission delay of the preliminary path, a switching time is set to zero and normal switching is performed. See operations 106 and 108. If the one way fiber transmission delay of the actual path is less than the one way fiber transmission delay of the preliminary path, a switching time is set equal to the one way fiber transmission delay of the preliminary path minus the one way fiber transmission delay of the actual path. See operation 110. Additionally, it is determined whether a path alarm indication signal (AIS) occurred in the actual path. See operation 112.

If the AIS occurred in the actual path, path switching of the actual path is stopped within the switching time and it is determined whether a path alarm indication signal occurred in the preliminary path. See operations 114 and 116. If the path alarm indication signal did not occur in the preliminary path, normal path switching is performed for the actual path. See operation 118.

In this way, when a path AIS is generated by an abnormal transmission path at a path transmission end, unnecessary switching may be prevented at the path receiving end. Thus, switching may be quickly performed when a path alarm occurs due to abnormal communication between nodes.

FIG. 2A shows a ring network, in accordance with one embodiment. With reference to FIG. 2A, when detecting a path AIS in both a W side and an E side, the path AIS being generated by abnormalities in the transmission path of node A, a difference in the route length and number of nodes between the E side route (route 1) from node A to node C and the W side route (route 2) may cause transmission delay in the W side path and E side path. During the delay time, in both the W and E side path at least one AIS is inserted. In some cases, however, an unnecessary switching may occur, triggered by the AIS of the path, which reached node C first.

FIG. 2B, shows the function of reception nodes of FIG. 2A, in accordance with one embodiment. In this case, a one way fiber transmission delay measurement function may be implemented where the one way fiber transmission delay equals the distance delay plus the time elapsed in the passing node. Additionally, the difference of the one way fiber transmission delay equals the difference of the distance delay plus the difference of the time elapsed in the passing node. Furthermore, the waiting time for switching equals the difference of the one way fiber transmission delay plus a margin.

FIG. 2C, shows an interaction between different interface devices of FIG. 2A, in accordance with one embodiment. In this case, a PING request is transmitted from the actual path. The PING request may also be transmitted from the preliminary path. However, the PING request does not pass through the path switching part to be discarded. A PING response is transmitted from the actual path and preliminary path is monitored by one way fiber transmission delay measurement function parts of the W side and E side, respectively. It is possible to measure this because there is a one way fiber transmission delay measurement function part before the path switching part. In this case, the one way fiber transmission delay equals the difference in the PING request (this is the same) plus the difference in the PING response (this is different).

Table 1 shows a waiting time calculation for switching, in accordance with one embodiment.

TABLE 1

In the case of the actual path:

Difference in one way fiber transmission delay = Actual path is longer:
Waiting time for switching = 0
Difference in one way fiber transmission delay = Actual path is shorter:
Waiting time for switching = Correlation function of difference in RTT
In the case of the preliminary path:

Difference in one way fiber transmission delay = Preliminary path is longer:
Waiting time for switching = 0
Difference in one way fiber transmission delay = Preliminary path is shorter:
Waiting time for switching = Correlation function of difference in one way fiber transmission delay
or Waiting time for switching = 0
(To be selected according to management policy)

In this way, waiting time for switching may be changed. Furthermore, waiting time for switching may be adjusted, where adjustment of timing of switching may be accomplished by calculating waiting time for switching utilizing an easy round-trip time (RTT) measurement by an existing technique such as a generic framing procedure (GFP).

As another option, time stamp information maybe embedded into Path Overhead (POH) of a SONET frame to measure the delay time. Thus, useless switching may be eliminated, AIS false operation may be eliminated, useless waiting time for switching may be minimized, and frequently varying conditions of the actual path and preliminary path may be dealt with on an on-demand basis. Furthermore, any of the techniques mentioned may be applied to existing SONET/SDH networks.

It should be noted that, the invention can take the form of an embodiment containing both hardware and software elements. In one embodiment, the invention may be implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for setting a value of waiting time for switching, the method comprising:
    at a node in a sonet ring:
        determining which path to the node is an actual path and which path is a preliminary path;
        determining whether a one way fiber transmission delay of the actual path is less than a one way fiber transmission delay of the preliminary path;
        if the one way fiber transmission delay of the actual path is greater than the one way fiber transmission delay of the preliminary path, setting a switching time to zero and performing normal switching;

if the one way fiber transmission delay of the actual path is less than the one way fiber transmission delay of the preliminary path:
  setting a switching time equal to the one way fiber transmission delay of the preliminary path minus the one way fiber transmission delay of the actual path;
  determining whether a path alarm indication signal (AIS) occurred in the actual path;
  if the path alarm indication signal (AIS) occurred in the actual path:
    stopping path switching of the actual path within the switching time;
    determining whether a path alarm indication signal occurred in the preliminary path;
    if the path alarm indication signal did not occur in the preliminary path, performing normal path switching for the actual path.

* * * * *